(12) United States Patent
Hadehara

(10) Patent No.: US 8,246,165 B2
(45) Date of Patent: Aug. 21, 2012

(54) EYEGLASSES

(75) Inventor: Shinichi Hadehara, Osaka (JP)

(73) Assignee: Yamamoto Kogaku Co., Ltd., Higashiosaka-Shi, Osaka (JP)

(*) Notice: Subject to any disclaimer, the term of this patent is extended or adjusted under 35 U.S.C. 154(b) by 177 days.

(21) Appl. No.: 12/765,919

(22) Filed: Apr. 23, 2010

(65) Prior Publication Data

US 2010/0271586 A1    Oct. 28, 2010

(30) Foreign Application Priority Data

Apr. 24, 2009 (JP) ................... 2009-106369

(51) Int. Cl.
G02C 1/00 (2006.01)

(52) U.S. Cl. ............ 351/86; 351/83; 351/103; 351/106; 351/110

(58) Field of Classification Search .................... 351/83, 351/86, 103, 106, 110, 116, 124, 140
See application file for complete search history.

(56) References Cited

U.S. PATENT DOCUMENTS 5,661,536 A * 8/1997 Conway .................. 351/121
7,261,410 B1 * 8/2007 Chen ........................ 351/110

FOREIGN PATENT DOCUMENTS

| JP | 2-30920 | 2/1990 |
|----|---------|--------|
| JP | 6-175085 A | 6/1994 |
| JP | 2010054738 A | 3/2010 |

* cited by examiner

*Primary Examiner* — Hung Dang
(74) *Attorney, Agent, or Firm* — Heslin Rothenberg Farley & Mesiti P.C.

(57) ABSTRACT

There are provided eyeglasses in which an elastically deformable locking member comprising a pair of locking claws is projectingly provided in at least one location of an outer peripheral edge of a lens. An angle at which a centerline of one locking claw intersects with a centerline of the other locking claw is 10 to 120 degrees. The locking member is locked to at least either of a lens frame and a nose pad.

13 Claims, 19 Drawing Sheets

Fig.8 - Prior Art
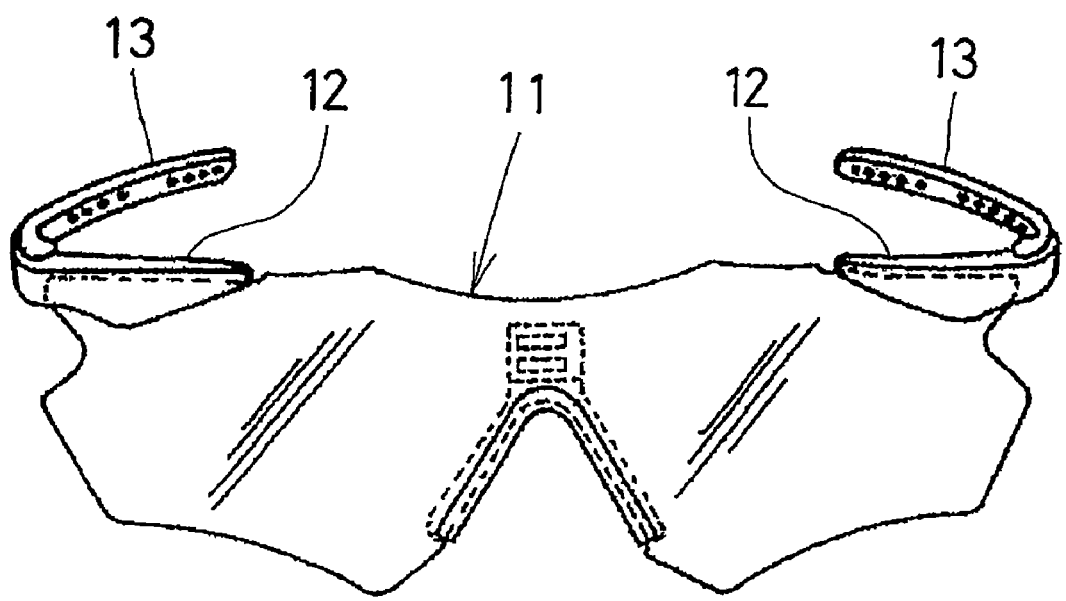

Fig.9 - Prior Art
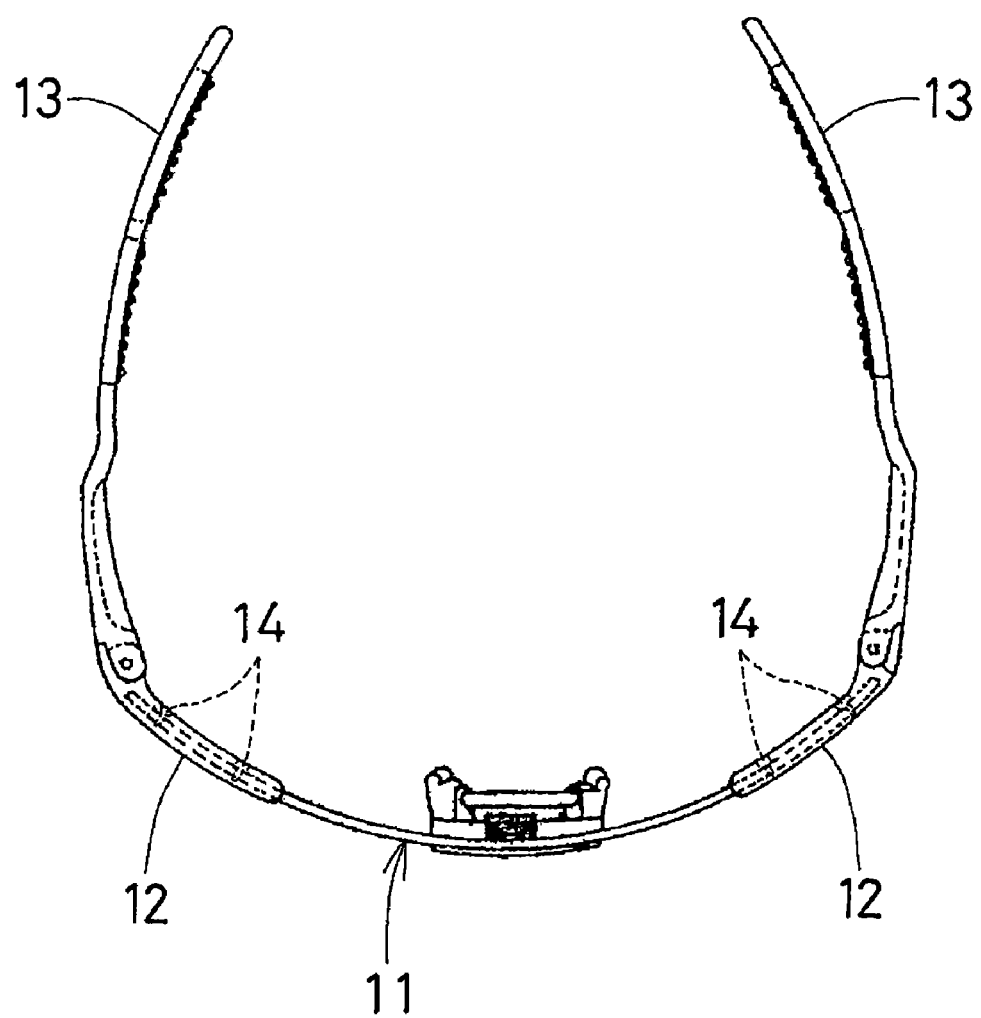

Fig.10 - Prior Art
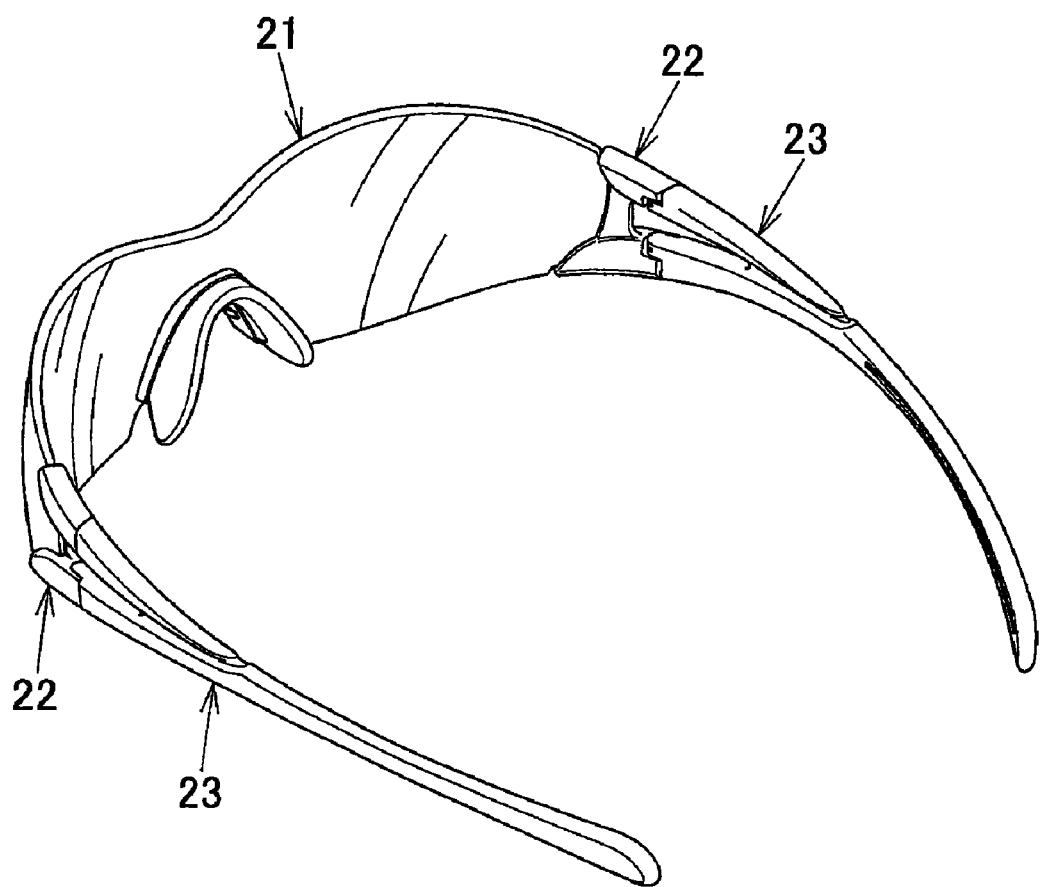

Fig.11 - Prior Art
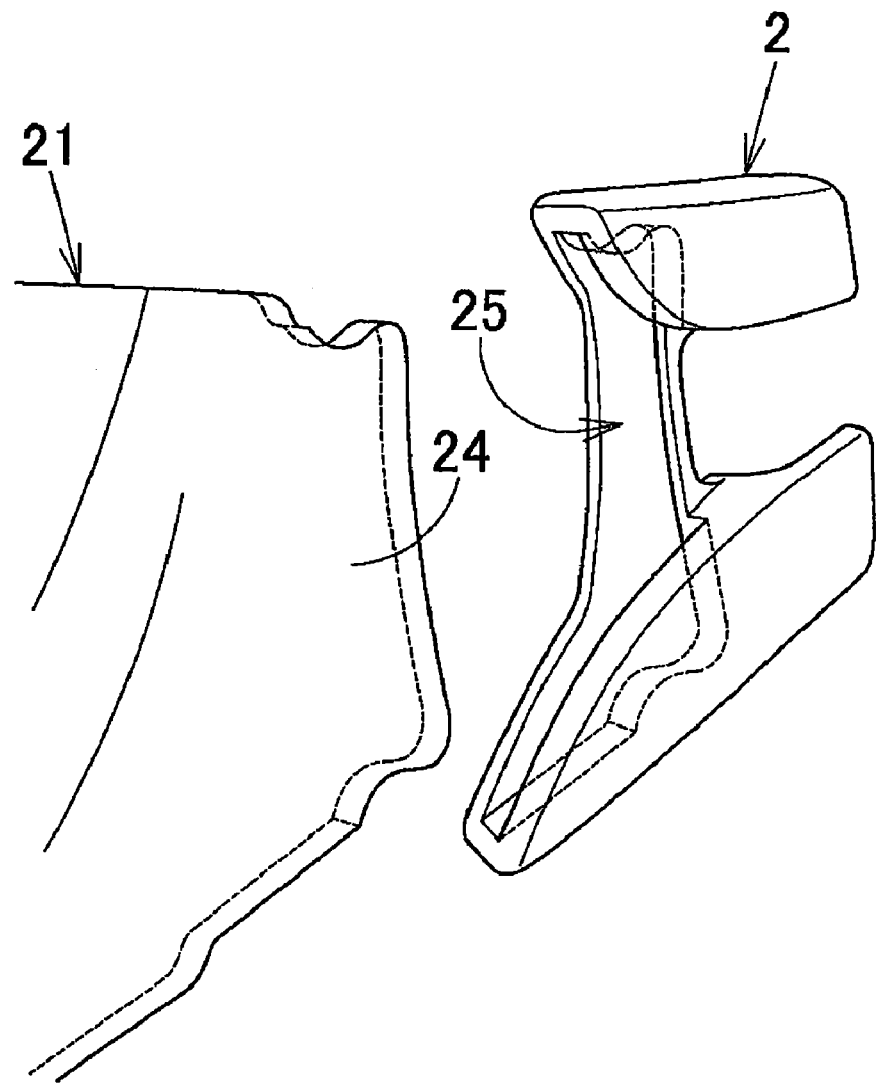

EYEGLASSES

CROSS REFERENCE TO RELATED APPLICATION

This application claims priority of Japanese patent application No. 2009-106369 filed Apr. 24, 2009, the entire contents of which is hereby incorporated herein by reference.

BACKGROUND OF THE INVENTION

1. Field of the Invention

The present invention relates to eyeglasses used for sports, industrial activities, eyesight correction, protection of eyes from the sun, and the like.

2. Description of the Related Art

Conventionally, as the eyeglasses of this type, eyeglasses, for example, as shown in FIGS. 8 and 9 have been available. The eyeglasses shown in FIGS. 8 and 9 are sunglasses, and include a properly curved single lens 11 having flexibility and elasticity. At the upper edges of both-side end parts of the lens 11, a pair of right and left frames 12 are fixed, and each of the frames 12 is mounted with a temple 13. Specifically, threaded holes (not shown) are provided at the upper edges of both-side end parts of the lens 11, and the frames 12 are detachably fixed to the lens 11 by installing and tightening machine screws 14 into the threaded holes (Japanese Patent Laid-Open No. 6-175085).

Furthermore, as the eyeglasses of this type, eyeglasses, for example, as shown in FIGS. 10 and 11 have been available. The eyeglasses shown in FIGS. 10 and 11 are sunglasses, and include a properly curved single lens 21 having flexibility and elasticity, a pair of right and left elastically deformable frames 22 mounted in the side end parts of the lens 21, and a pair of right and left temples 23 mounted to the frames 22. The side end part of the lens 21 serves as a frame fitting part 24, a lens fitting hole 25 is provided in the front part of the frame 22, and the frame fitting part 24 is fitted into the lens fitting hole 25. Thereby, the frame 22 is detachably mounted to the lens 21 (Japanese Patent Application No. 2008-218780).

For the eyeglasses described in Japanese Patent Laid-Open No. 6-175085, the frames 12 are detachably fixed at the upper edges of both-side end parts of the lens 11 by using the machine screws 14. Therefore, the fixation strength is sufficient. However, the eyeglasses of this type have a problem that the assembling thereof requires much time and labor, and although being detachable, the frames cannot be attached and detached easily, so that the exchange of lens is troublesome. Also, the eyeglasses of this type have a problem that if the machine screw 14 is tightened too strongly, a flaw is developed easily on the lens 11.

For the eyeglasses described in Japanese Patent Application No. 2008-218780, in the state in which the frame fitting part 24 of the lens 21 is fitted in the lens fitting hole 25 in the frame 22, a stress caused by this fitting is applied to the whole region of the side end part of the lens 21. Therefore, the eyeglasses of this type have a problem that distortion is produced in the side end part by this stress, and this distortion exerts an adverse influence on the optical performance and strength of the lens 21.

SUMMARY OF THE INVENTION

The present invention has been made to solve the above problems, and accordingly an object thereof is to provide eyeglasses in which a lens can be attached to and detached from a frame and a nose pad easily, so that the lens can be exchanged very easily, and further in the state in which the lens is mounted to the frame and the nose pad, the lens is not distorted, and the optical performance and strength of the lens are not adversely affected.

To achieve the above object, the present invention provides eyeglasses in which an elastically deformable locking member 2 consisting of a pair of locking claws 2a and 2b is projectingly provided in at least one location of the outer peripheral edge of a lens 1, an angle θ at which a centerline Ca of one locking claw 2a intersects with a centerline Cb of the other locking claw 2b is 10 to 120 degrees, and the locking member 2 is locked to at least either of a lens frame 3 and a nose pad 4.

In the eyeglasses in accordance with the present invention, the centerline Ca of the one locking claw 2a intersects with the centerline Cb of the other locking claw 2b on the outside of the outer peripheral edge.

In the eyeglasses in accordance with the present invention, the centerline Ca of the one locking claw 2a intersects with the centerline Cb of the other locking claw 2b on the inside of the outer peripheral edge.

In the eyeglasses in accordance with the present invention, each of the locking claws 2a and 2b has a width H and a height T, and the width H is smaller than the height T.

In the eyeglasses in accordance with the present invention, the locking member 2 is projectingly provided in a concave part 5 formed at the outer peripheral edge of the lens 1.

In the eyeglasses in accordance with the present invention, the angle θ is 30 to 90 degrees.

In the eyeglasses in accordance with the present invention, a locking convex part 6a locked by being held between the locking claws 2a and 2b of the locking member 2 is provided on at least either of the lens frame 3 and the nose pad 4.

In the eyeglasses in accordance with the present invention, a fitting groove 7 in which the outer peripheral edge of the lens 1 is fitted is provided on at least either of the lens frame 3 and the nose pad 4, and the locking convex part 6a locked by being held between the locking claws 2a and 2b of the locking member 2 is provided in the fitting groove 7.

In the eyeglasses in accordance with the present invention, a locking concave part 6b locked by being held by the locking claws 2a and 2b of the locking member 2 is provided on at least either of the lens frame 3 and the nose pad 4.

In the eyeglasses in accordance with the present invention, a fitting groove 7 in which the outer peripheral edge of the lens 1 is fitted is provided on at least either of the lens frame 3 and the nose pad 4, and the locking concave part 6b locked by being held by the locking claws 2a and 2b of the locking member 2 is provided in the fitting groove 7.

Since the eyeglasses in accordance with the present invention are configured as described above, the lens can be attached to and detached from the lens frame and the nose pad easily, so that the lens can be exchanged very easily.

Furthermore, for the eyeglasses in accordance with the present invention, in the state in which the lens is mounted to the frame and the nose pad, the lens is not distorted, and the optical performance and strength of the lens are not adversely affected.

BRIEF DESCRIPTION OF THE DRAWINGS

FIG. 8 is a front view showing one example of conventional eyeglasses;

FIG. 9 is a plan view of the eyeglasses shown in FIG. 8;

FIG. 10 is a perspective view showing another example of conventional eyeglasses, being viewed from the rear; and FIG. 11 is an explanatory view showing the side end part of a lens and a lens fitting hole in the front part of a frame of the eyeglasses shown in FIG. 10.

DETAILED DESCRIPTION OF THE PREFERRED EMBODIMENTS

Embodiments of eyeglasses in accordance with the present invention will now be described in detail with reference to the accompanying drawings.

As shown in the figures, the eyeglasses of the present invention are configured so that an elastically deformable locking member 2 is projectingly provided in at least one location of the outer peripheral edge of a lens 1 so that the locking member 2 is locked to at least either of a lens frame 3 and a nose pad 4. The lens is desirably made of a synthetic resin considering the polarizing and modulating functions, surface treatment such as coating, productivity, and the like. In particular, considering the shock resistance and the elasticity function of the locking member 2, polycarbonate is cited as the typical raw material of the lens 1. Further, although the raw material of the lens frame 3 is not subject to any special restriction as long as the locking member 2 can lock, considering the productivity and decorativeness, a nylon-base resin is cited as the typical raw material thereof.

Figure 7A:
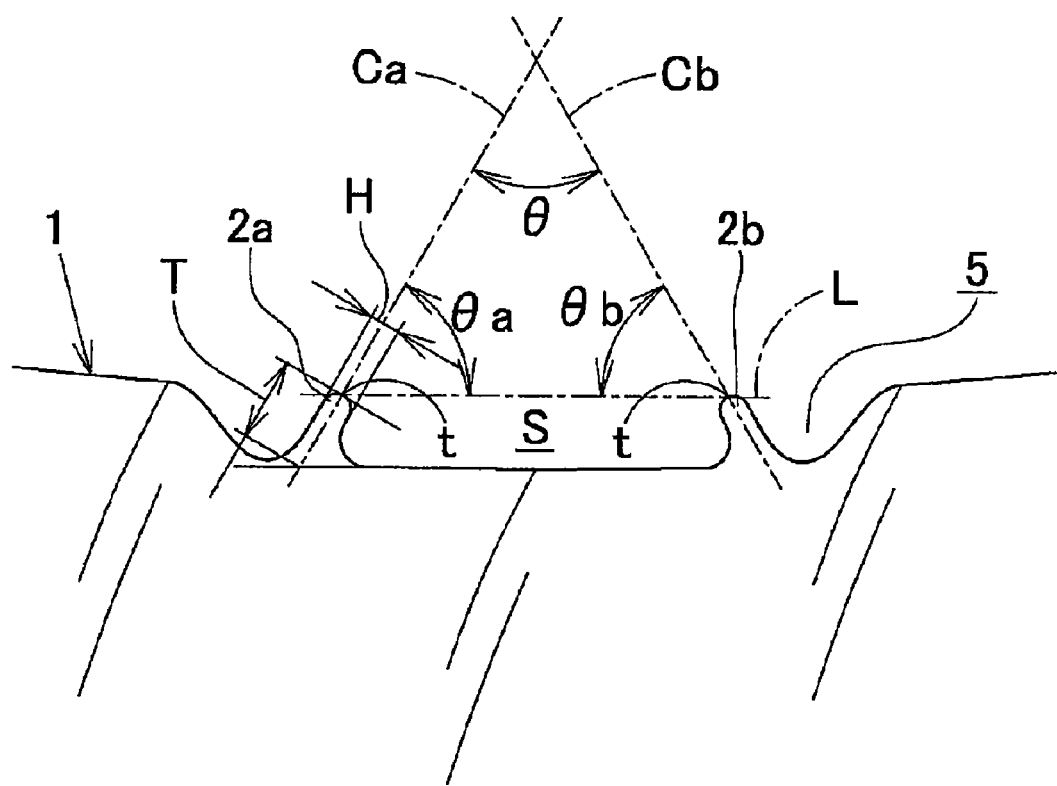
FIG. 7a is an explanatory view showing one example of a locking member projectingly provided on a lens of the eyeglasses in accordance with the present invention.

The locking member 2 consists of a pair of locking claws 2a and 2b that are elastically deformable. As shown in FIG. 7a, the centerline Ca of one locking claw 2a and the centerline Cb of the other locking claw 2b intersect with each other at an angle $\theta$ at a point on the outside of the outer peripheral edge.

Further, the locking member 2 consists of a pair of locking claws 2a and 2b that are elastically deformable.

Figure 7B:
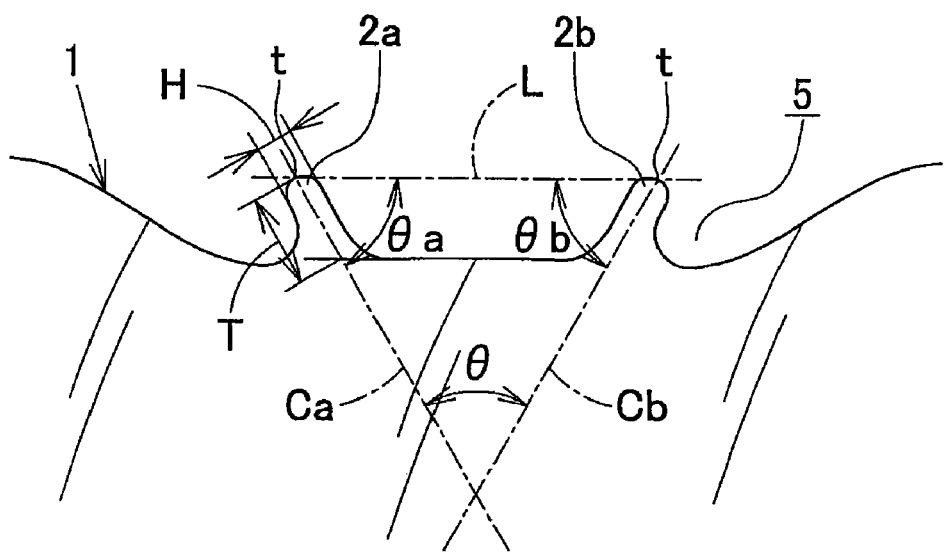
FIG. 7b is an explanatory view showing another example of a locking member projectingly provided on a lens of the eyeglasses in accordance with the present invention.

As shown in FIG. 7b, the centerline Ca of one locking claw 2a and the centerline Cb of the other locking claw 2b may intersect with each other at an angle $\theta$ at a point on the inside of the outer peripheral edge. At least one of the locking claws 2a and 2b is inclined.

Each of the locking claws 2a and 2b has a width H and a height T, and the width H is smaller than the height T. The reason for this is that the locking claw 2a, 2b can be elastically deformed easily. Further, the locking claw 2a, 2b is formed so that both sides of the root part thereof are formed into a curved shape so that the root part is made thick. By doing this, after the stress caused by the elastic deformation of the locking claw 2a, 2b has been absorbed by the whole of the curved part, the locking claw 2a, 2b is restored to the original state without remaining distortion. Therefore, the durability of the locking claw 2a, 2b is excellent. Also, the locking claw 2a, 2b is formed so that the tip-end corners thereof are cut by forming the tip end thereof into a curved shape. By doing this, the locking claw 2a, 2b can be locked to the lens frame 3 and the nose pad 4 without damaging these elements.

Figure 1:
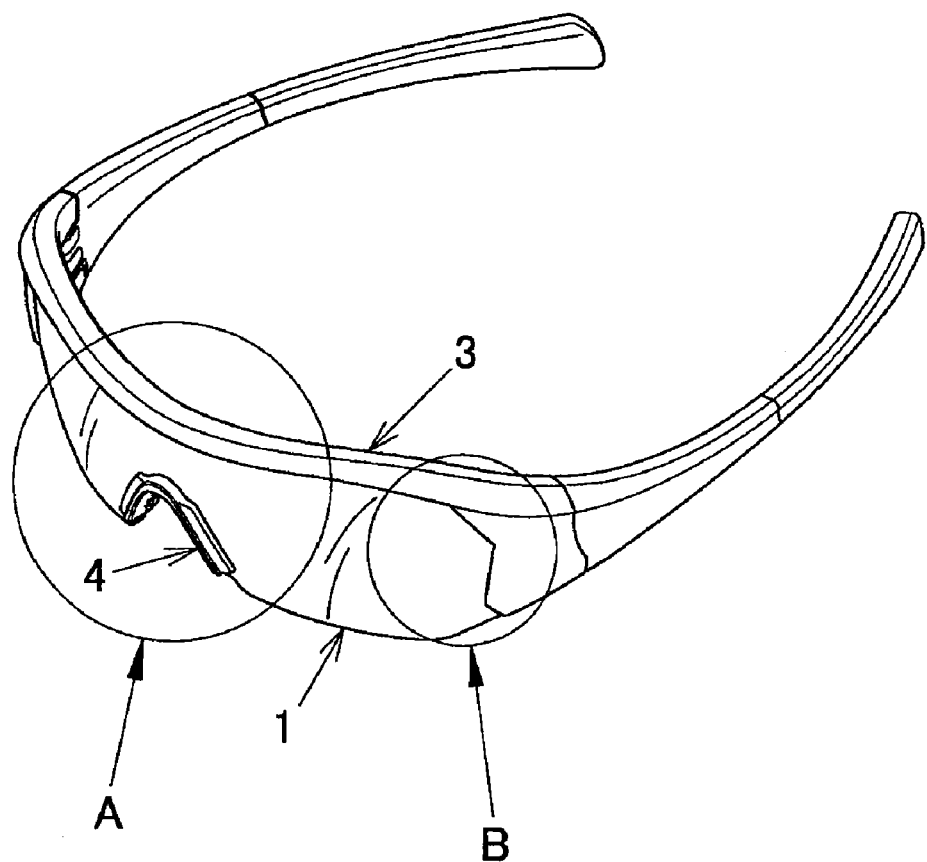
FIG. 1 is a perspective view showing one embodiment of eyeglasses in accordance with the present invention.
Figure 2A:
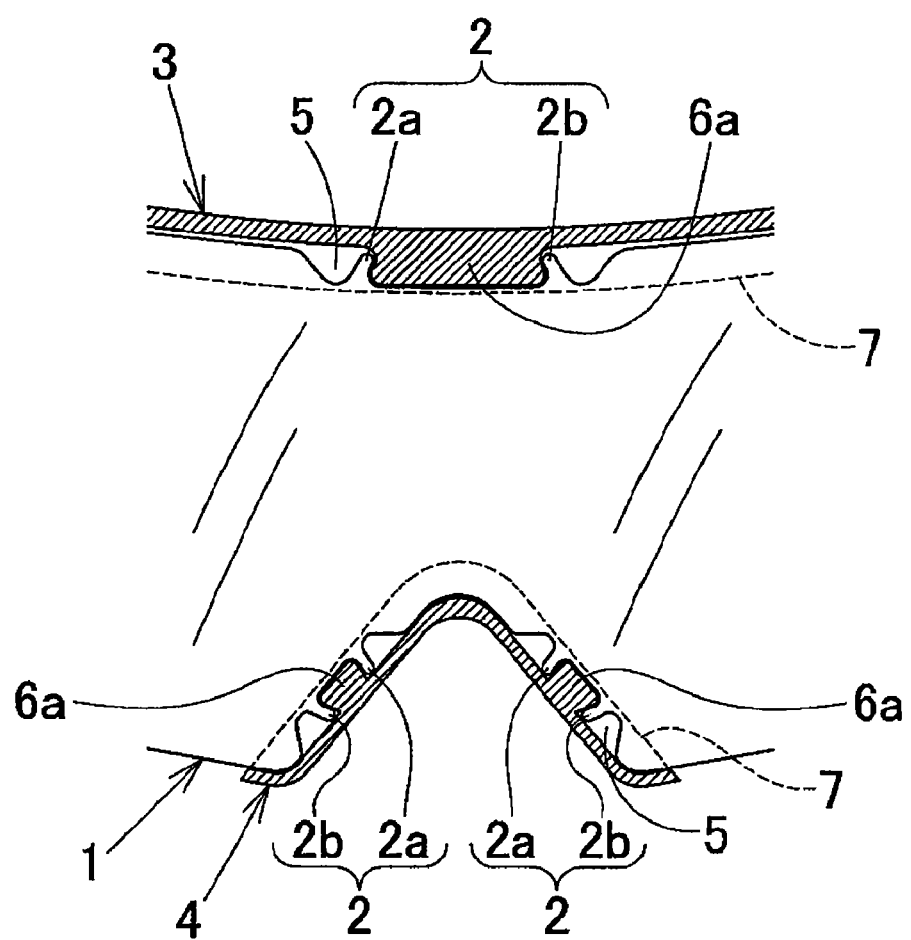
FIG. 2a is an explanatory view showing one example of a state of locking a lens to a frame and locking the lens to a nose pad, showing a portion surrounded by circle A in FIG. 1.
Figure 2B:
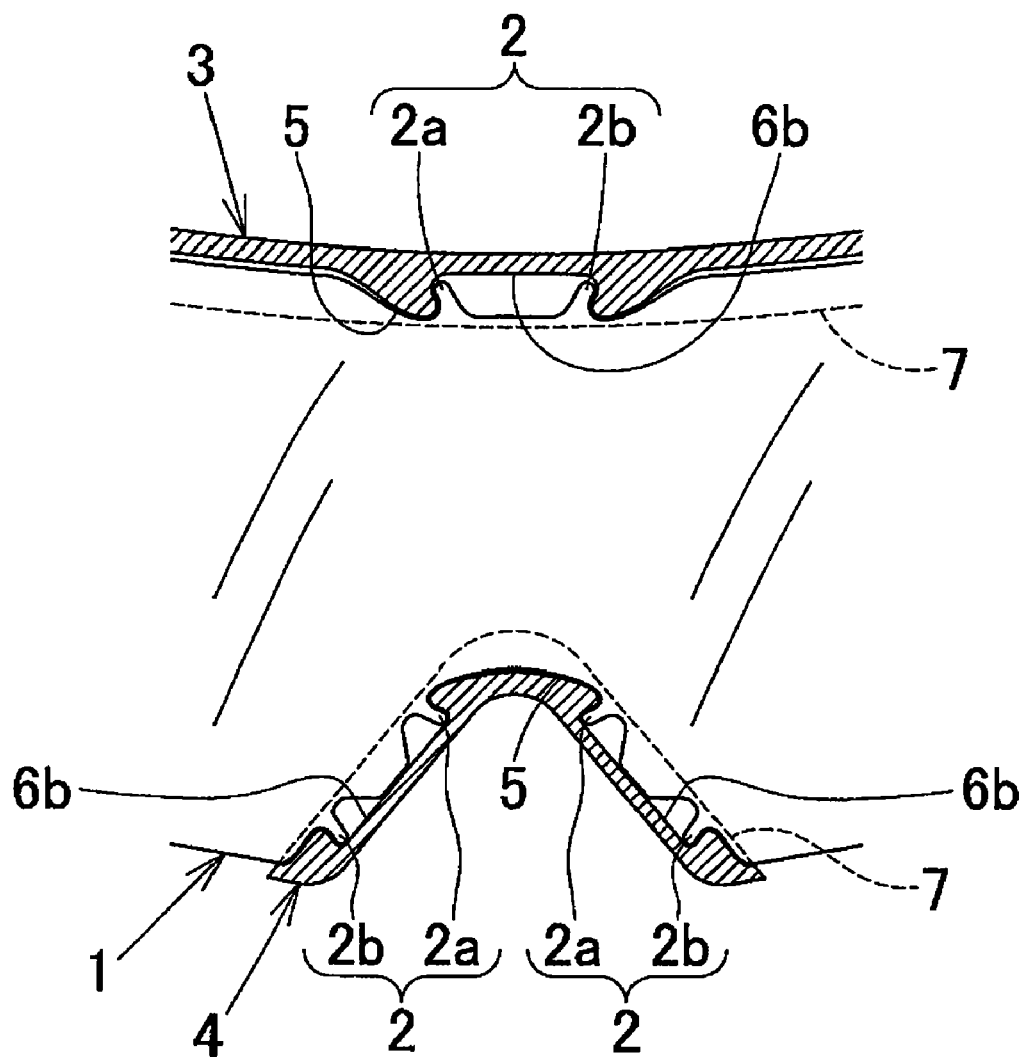
FIG. 2b is an explanatory view showing another example of a state of locking a lens to a frame and locking the lens to a nose pad, showing a portion surrounded by circle A in FIG. 1.
Figure 2C:
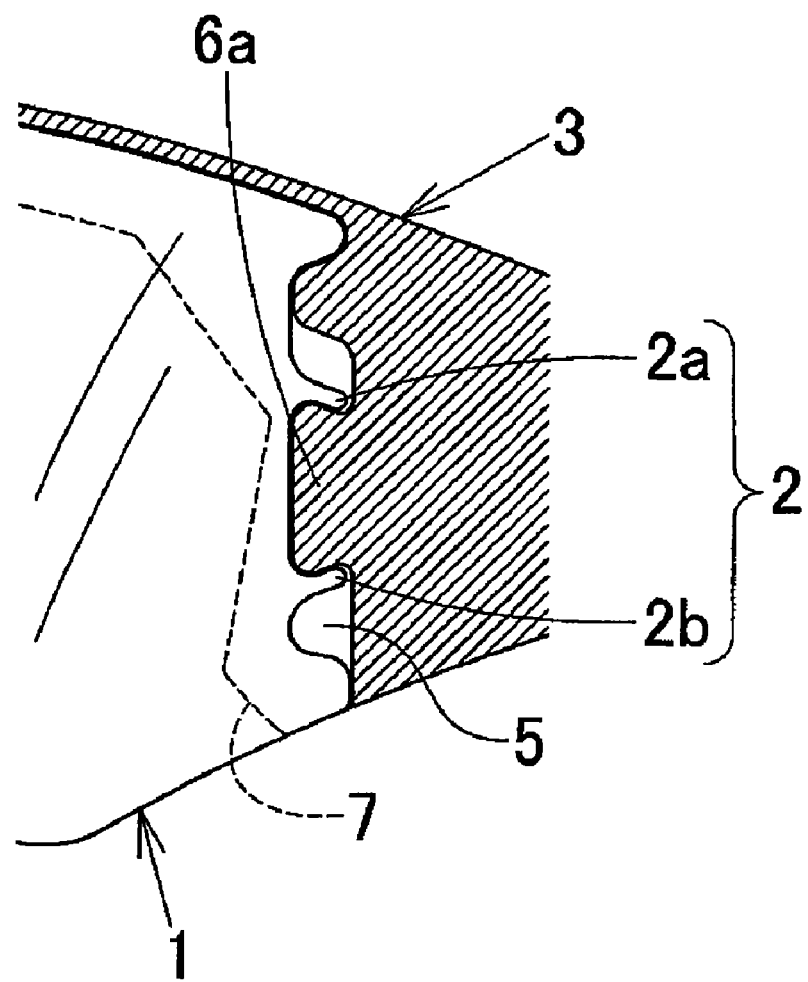
FIG. 2c is an explanatory view showing one example of a state of locking a lens to a frame, showing a portion surrounded by circle B in FIG. 1.
Figure 2D:
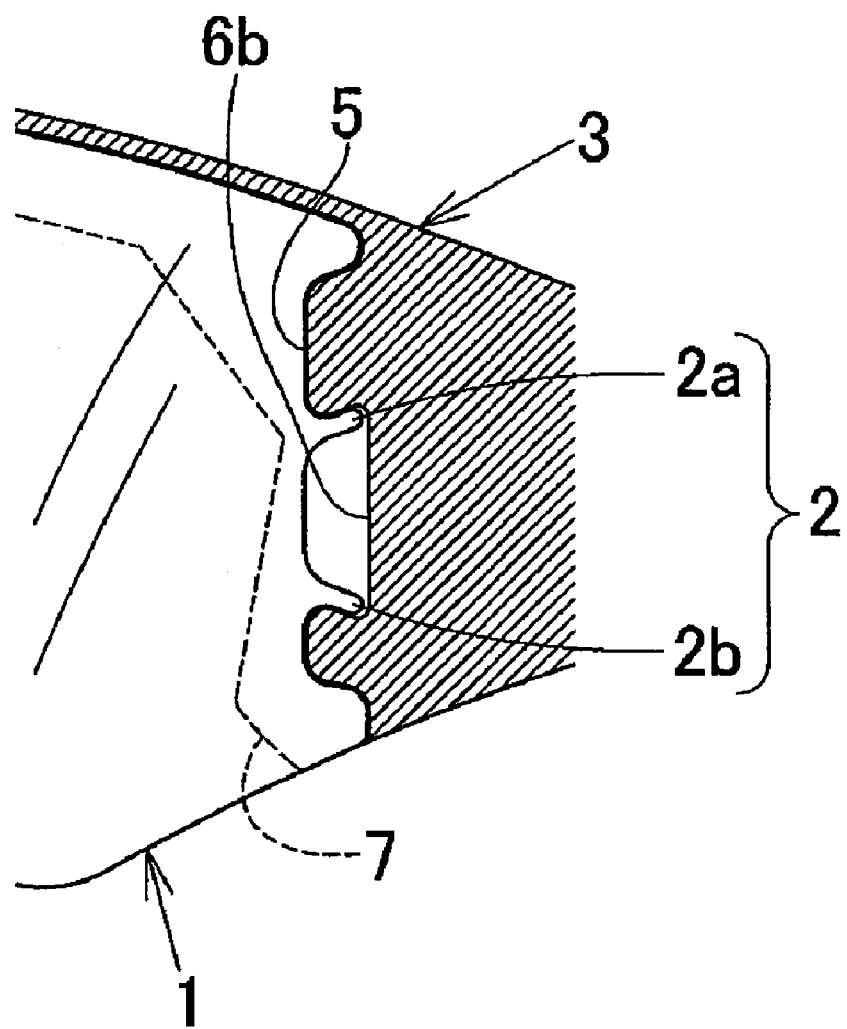
FIG. 2d is an explanatory view showing another example of a state of locking a lens to a frame, showing a portion surrounded by circle B in FIG. 1.

For the eyeglasses in accordance with the present invention shown in FIG. 1, the lens 1 consists of a single lens, and the locking members 2 are projectingly provided at the outer peripheral edge of the central upper end part of the lens 1, at the outer peripheral edge of the nose pad part in the central lower end part of the lens 1, and at the outer peripheral edges of both side parts of the lens 1.

Figure 3:
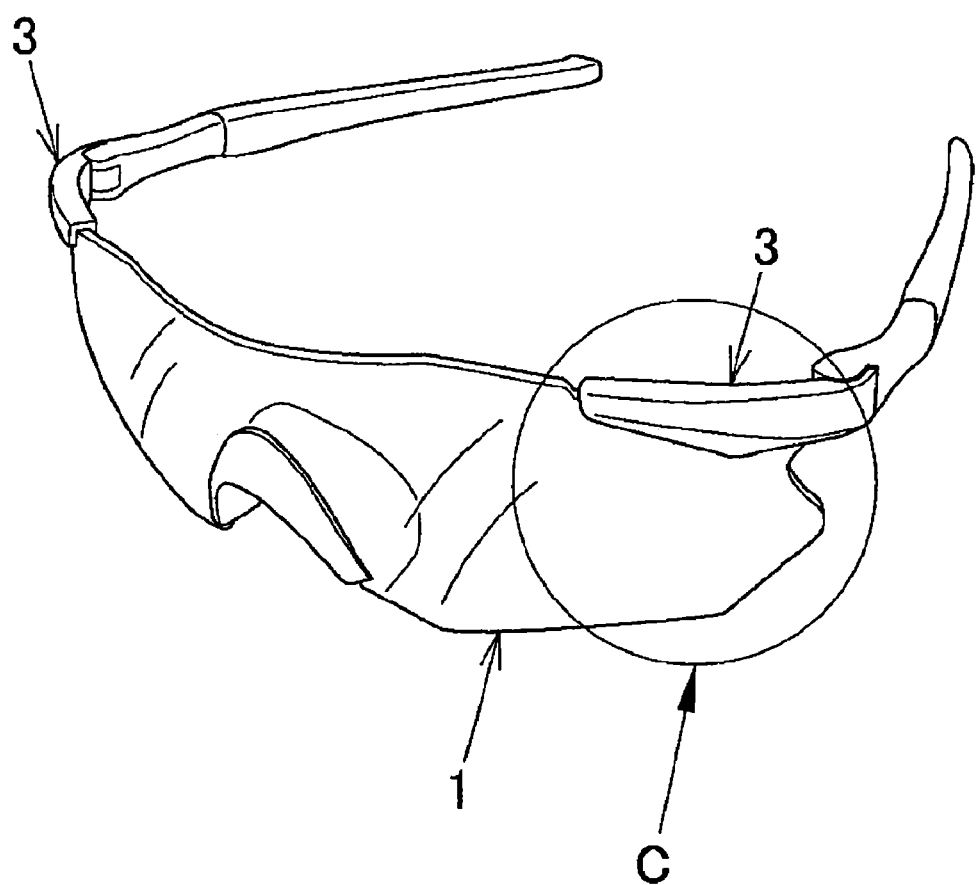
FIG. 3 is a perspective view showing another embodiment of eyeglasses in accordance with the present invention.
Figure 5:
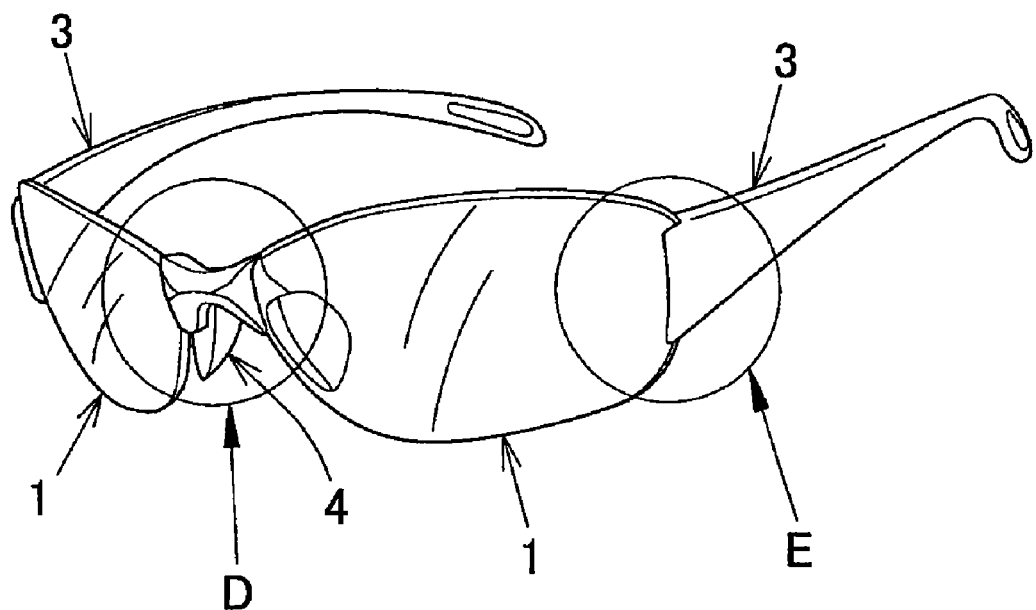
FIG. 5 is a perspective view showing still another embodiment of eyeglasses in accordance with the present invention.
Figure 6A:
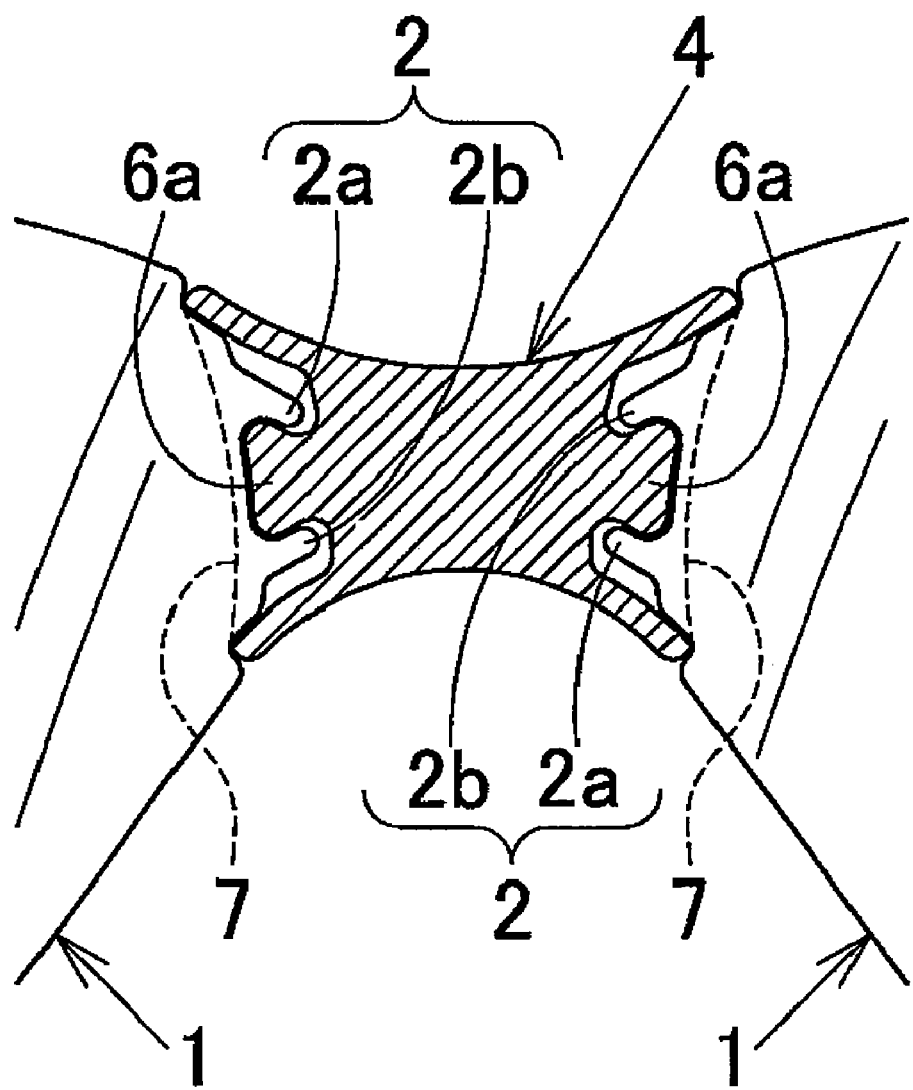
FIG. 6a is an explanatory view showing one example of a state of locking a lens to a nose pad, showing a portion surrounded by circle D in FIG. 5.
Figure 6B:
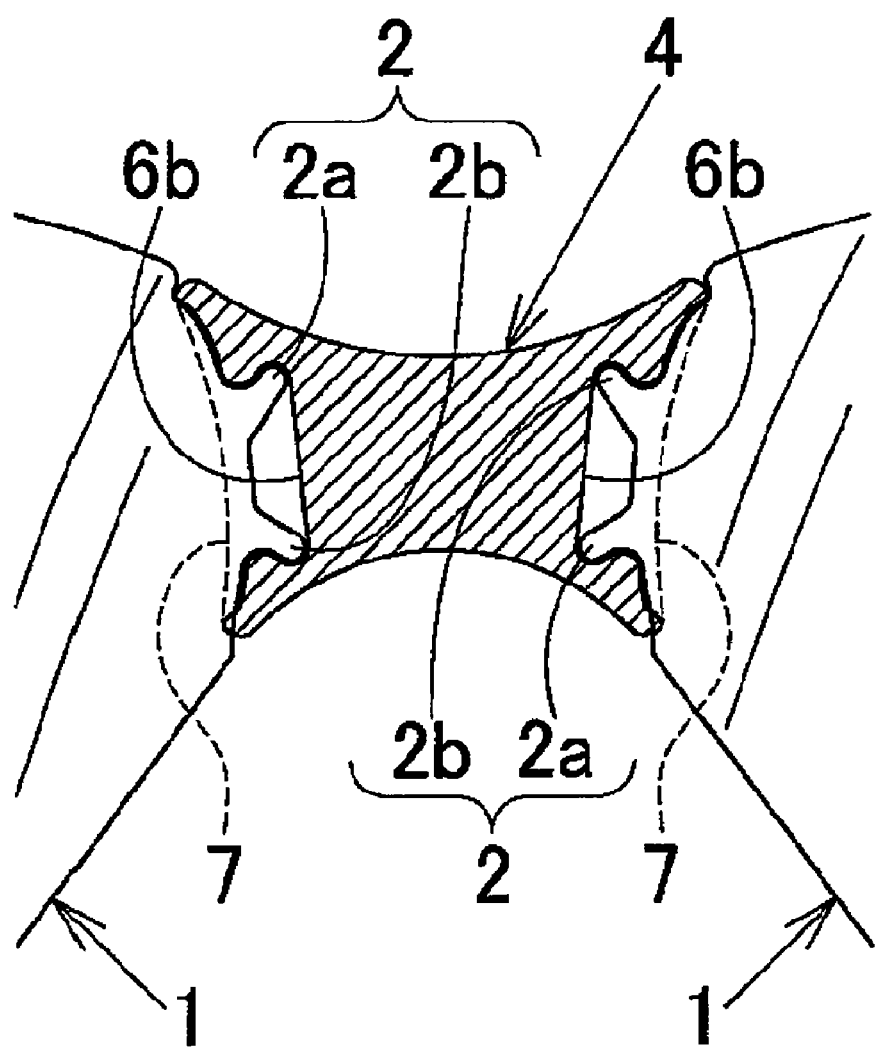
FIG. 6b is an explanatory view showing another example of a state of locking a lens to a nose pad, showing a portion surrounded by circle D in FIG. 5.
Figure 6C:
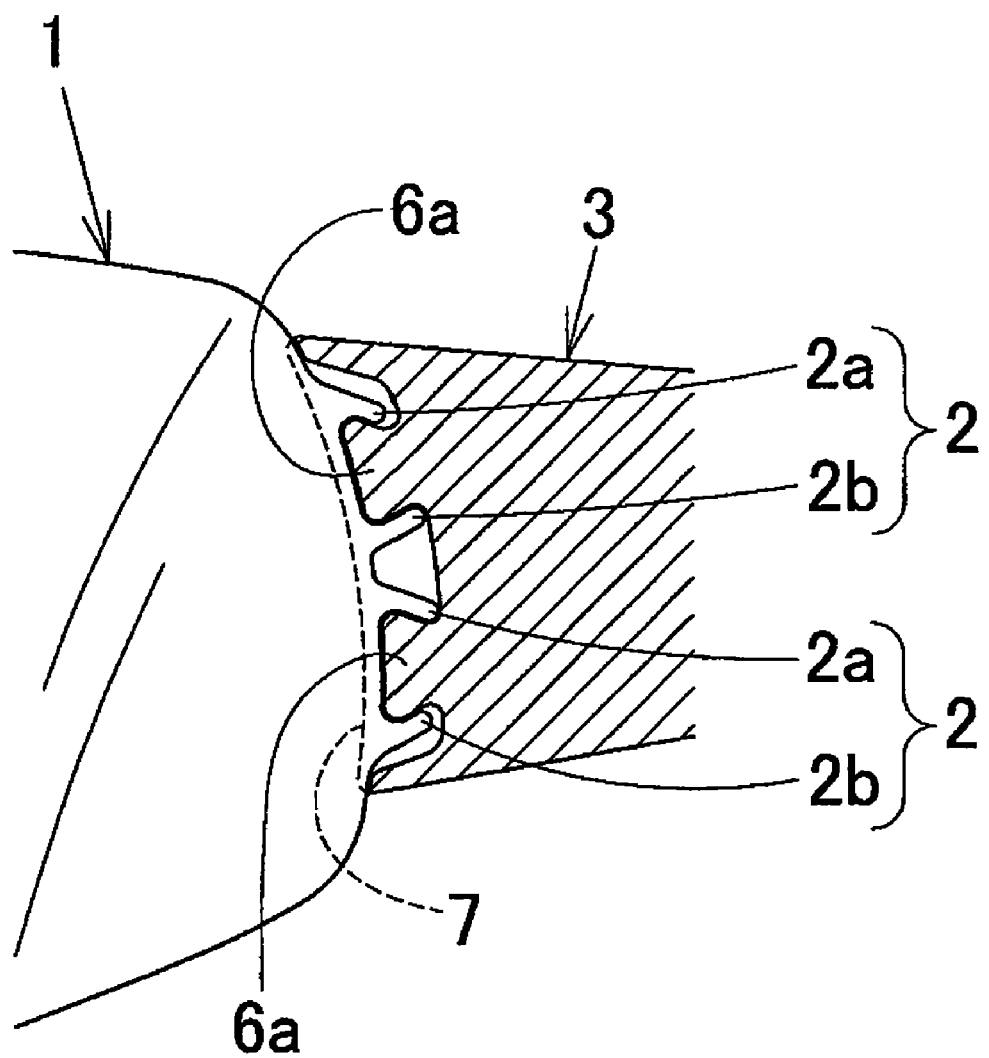
FIG. 6c is an explanatory view showing one example of a state of locking a lens to a frame, showing a portion surrounded by circle E in FIG. 5.
Figure 6D:
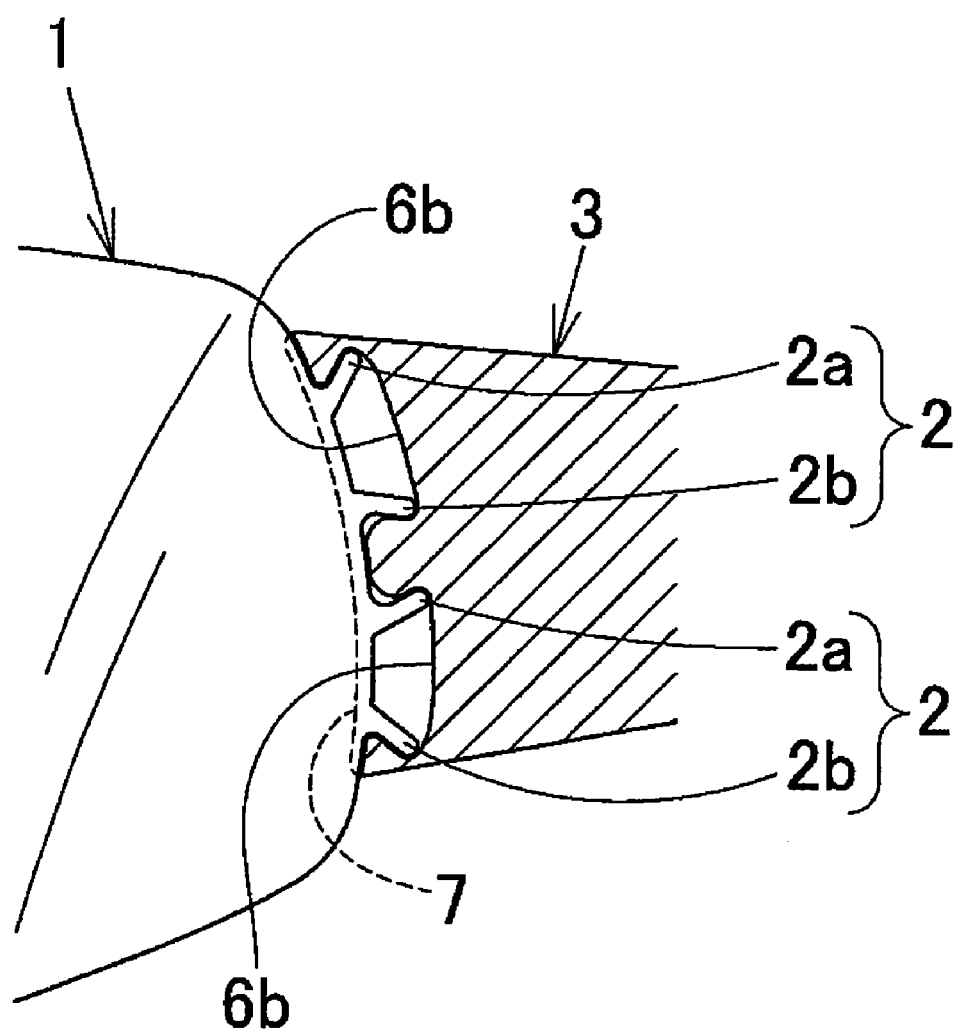
FIG. 6d is an explanatory view showing another example of a state of locking a lens to a frame, showing a portion surrounded by circle E in FIG. 5.

Further, for the eyeglasses in accordance with the present invention shown in FIG. 3, the lens 1 consists of a single lens, and the locking members 2 are projectingly provided at the outer peripheral edges of the side upper end parts of the lens 1. Also, for the eyeglasses in accordance with the present invention shown in FIG. 5, the lens 1 consists of two lenses, and the locking members 2 are projectingly provided at the opposed outer peripheral edge of the inside part of each of the lenses 1 and at the outer peripheral edge of the outside part of each of the lenses 1. For the eyeglasses in accordance with the present invention shown in FIG. 5, two locking members 2 are projectingly provided in series at the outer peripheral edge of the outside part of the lens 1, so that the state of locking to the lens frame 3 can be strengthened.

As shown in FIGS. 2a to 2d, 4a, and 4b, the locking member 2 is projectingly provided in a concave part 5 formed at the outer edge of the lens 1. Therefore, when the lens 1 is removed from the lens frame 3 or the nose pad 4, the locking member 2 is preferably less prone to be broken or bent by striking something because of being accommodated in the concave part 5. As shown in FIGS. 6a to 6d, the locking member 2 may be projectingly provided at the outer peripheral edge of the lens 1 without the formation of the concave part 5.

For the eyeglasses in accordance with the present invention, the angle $\theta$ can be made 10 to 120 degrees. The angle $\theta$ is preferably 30 to 90 degrees, further preferably 50 to 70 degrees. Since the locking member 2 is elastically deformable, if the angle $\theta$ is small, the state of locking of the locking member 2 to the lens frame 3 or the nose pad 4 becomes weak, and inversely, if the angle $\theta$ is large, the state of locking of the locking member 2 to the lens frame 3 or the nose pad 4 becomes strong. If the angle θ is within the above-described range, a proper locking state can be established.

For the eyeglasses in accordance with the present invention shown in the figures, an angle θa included between a straight line L connecting vertexes t of the locking claws 2a and 2b and the centerline Ca of the locking claw 2a is equal to an angle θb included between the straight line L and the centerline Cb of the locking claw 2b. Thereby, the forces of both the locking claws 2a and 2b for locking the lens frame 3 or the nose pad 4 are made equal, so that the lens frame 3 and the nose pad 4 are locked in good balance.

Furthermore, the eyeglasses in accordance with the present invention can be configured so that the angle θa included between the straight line L connecting the vertexes t of the locking claws 2a and 2b and the centerline Ca of the locking claw 2a is unequal to the angle θb included between the straight line L and the centerline Cb of the locking claw 2b. In this case, if the angle θa is smaller than the angle θb, the force of the locking claw 2a for locking the lens frame 3 or the nose pad 4 is higher, and inversely, if the angle θa is larger than the angle θb, the force of the locking claw 2a for locking the lens frame 3 or the nose pad 4 is lower.

Also, the eyeglasses in accordance with the present invention can be configured so that either one of the angle θa included between the straight line L connecting the vertexes t of the locking claws 2a and 2b and the centerline Ca of the locking claw 2a and the angle θb included between the straight line L and the centerline Cb of the locking claw 2b is 90 degrees. In this case, on either the locking claw 2a or the locking claw 2b whose angle θa or angle θb is 90 degrees, the force for locking the lens frame 3 or the nose pad 4 does not act. However, on the other locking claw 2a or the locking claw 2b whose angle θa or angle θb is not 90 degrees, the force for locking the lens frame 3 or the nose pad 4 acts. Therefore, there is no problem in locking the lens frame 3 or the nose pad 4.

The eyeglasses in accordance with the present invention shown in FIGS. 2a, 2c, 4a, 6a and 6c are configured so that a locking convex part 6a locked by being held between the locking claws 2a and 2b of the locking member 2 is provided on at least either of the lens frame 3 and the nose pad 4.

Furthermore, the eyeglasses in accordance with the present invention shown in FIGS. 2b, 2d, 4b, 6b and 6d are configured so that a locking concave part 6b locked by being held by the locking claws 2a and 2b of the locking member 2 is provided on at least either of the lens frame 3 and the nose pad 4.

The eyeglasses in accordance with the present invention shown in FIGS. 1 and 2a to 2d are configured so that the lens frame 3 is provided with fitting grooves 7 in which the outer peripheral edge of the upper end part of the lens 1 and the outer peripheral edges of both side parts of the lens 1 are fitted, and the locking convex parts 6a or the locking concave parts 6b are provided in the fitting grooves 7. Further, the eyeglasses in accordance with the present invention shown in these figures are configured so that the nose pad 4 is provided with the fitting groove 7 in which the outer peripheral edge of the nose pad part of the lens 1 is fitted, and the locking convex parts 6a or the locking concave parts 6b are provided oppositely in the fitting groove 7.

Figure 4A:
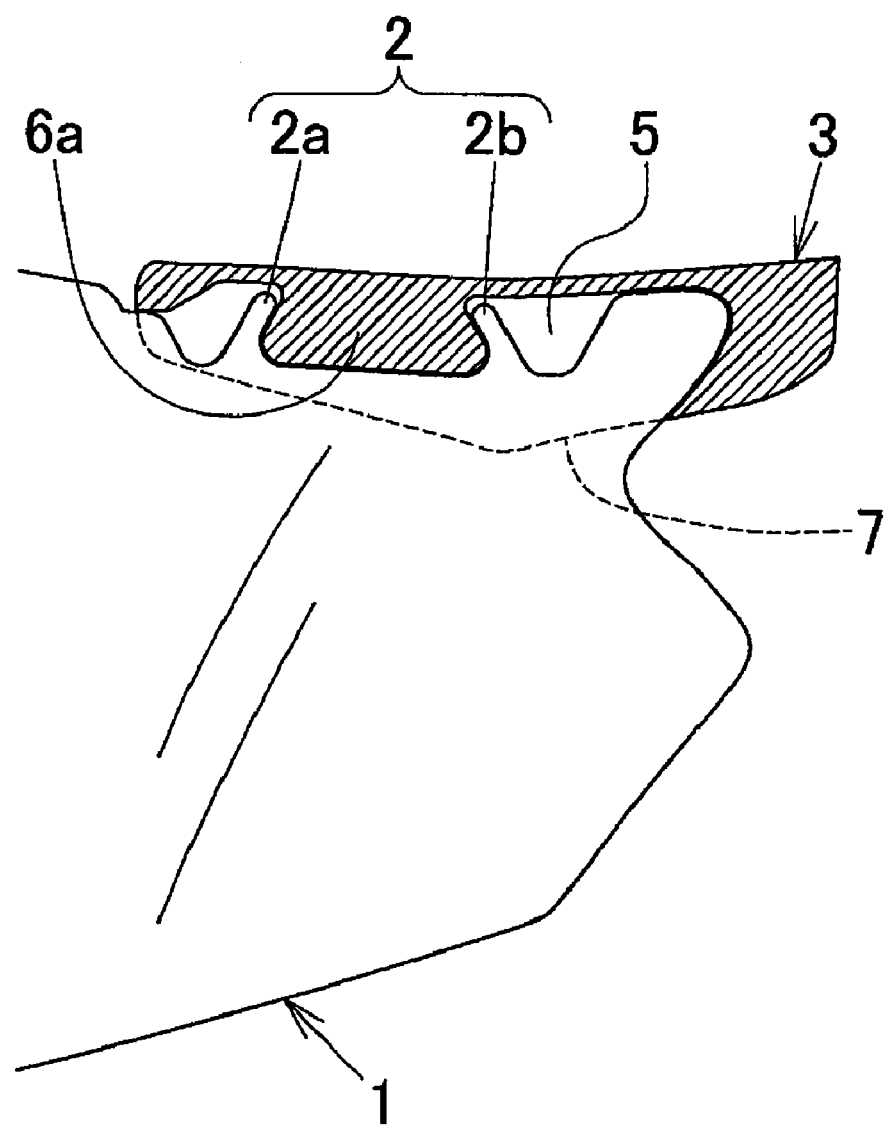
FIG. 4a is an explanatory view showing one example of a state of locking a lens to a frame, showing a portion surrounded by circle C in FIG. 3.
Figure 4B:
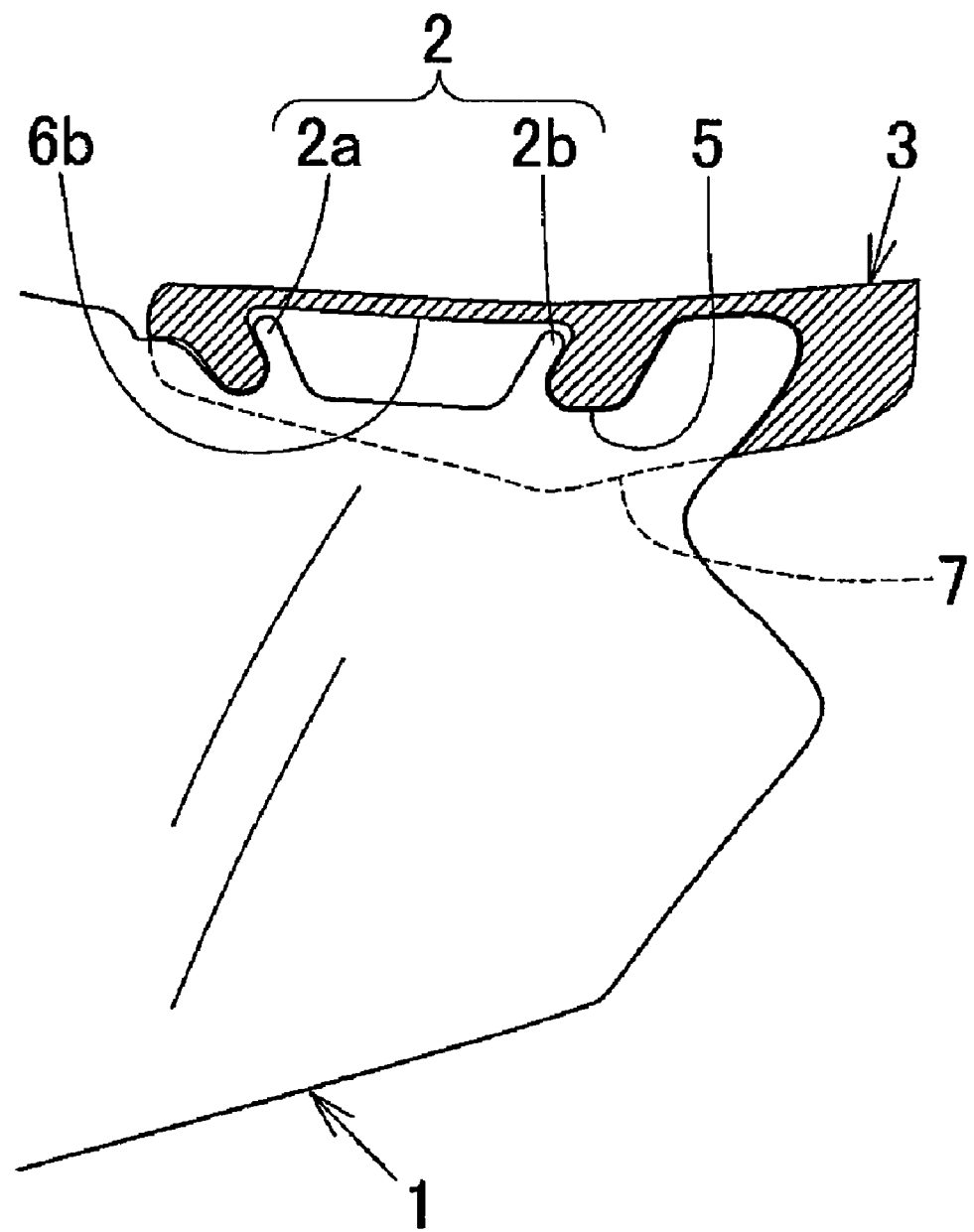
FIG. 4b is an explanatory view showing another example of a state of locking a lens to a frame, showing a portion surrounded by circle C in FIG. 3.

The eyeglasses in accordance with the present invention shown in FIGS. 3, 4a and 4b are configured so that the lens frame 3 is provided with the fitting groove 7 in which the outer peripheral edge of side part in the upper end part of the lens 1 is fitted, and the locking convex part 6a or the locking concave part 6b is provided in the fitting groove 7.

The eyeglasses in accordance with the present invention shown in FIGS. 5 and 6a to 6d are configured so that the lens frame 3 is provided with the fitting groove 7 in which the outer peripheral edge of the outside part of each of the two lenses 1 is fitted, and the two locking convex parts 6a or the two locking concave parts 6b are provided in series in the fitting groove 7.

Furthermore, the eyeglasses in accordance with the present invention shown in these figures is configured so that the nose pad 4 is provided with the fitting grooves 7 in which the outer peripheral edges of the inside parts of the two lenses 1 are fitted oppositely, and the locking convex part 6a or the locking concave part 6b is provided in each of the fitting grooves 7.

As shown in the figures, the locking convex part 6a has a substantially rectangular shape whose corners are cut, and is configured so as to enter a space S surrounded by the locking claws 2a and 2b of the locking member 2. As described above, the locking convex part 6a is provided in the fitting groove 7 so that the state of being locked to the locking member 2 does not shift, so that the locking convex part 6a is less prone to come off the locking member 2, and also the portion in which the locking convex part 6a engages with the locking member 2 is invisible, which makes the appearance good. The locking convex part 6a may be elastically deformable like the locking member 2, or may be elastically non-deformable.

As shown in the figures, the locking concave part 6b has a substantially rectangular shape whose corners are cut, and is configured so as to accommodate the locking claws 2a and 2b of the locking member 2 therein so as to surround them from the outside.

As described above, the locking concave part 6b is provided in the fitting groove 7 so that the state of being locked to the locking member 2 does not shift, so that the locking concave part 6b is less prone to come off the locking member 2, and also the portion in which the locking concave part 6b engages with the locking member 2 is invisible, which makes the appearance good. The locking concave part 6b may be elastically deformable like the locking member 2, or may be elastically non-deformable.

For the eyeglasses in accordance with the present invention configured as described above, the lens 1 can be attached to and detached from the frames 3 and the nose pad 4 easily by the locking/unlocking operation in which the elastically deformable locking member 2 projectingly provided at the outer peripheral edge of the lens 1 is locked to and unlocked from the locking convex part 6a or the locking concave part 6b provided on the lens frame 3 and the nose pad 4. Therefore, the lens can be exchanged very easily.

Furthermore, for the eyeglasses in accordance with the present invention, since the locking member 2 consists of the paired elastically deformable locking claws 2a and 2b, when the locking member 2 is locked to or unlocked from the locking convex part 6a or the locking concave part 6b provided on the lens frame 3 and the nose pad 4, the locking claws 2a and 2b are elastically deformed and thereafter are restored to the original state. Therefore, in the state in which the lens 1 is mounted to the lens frame 3 and the nose pad 4, the lens 1 is not distorted, and the optical performance and strength of the lens 1 are not adversely affected.

What is claimed is:
1. Eyeglasses in which
an elastically deformable locking member comprising a pair of locking claws is projectingly provided in at least one location of an outer peripheral edge of a lens, each locking claw extending longitudinally from the peripheral edge of the lens to a remote tip of the claw along a centerline;

an angle at which a centerline of one locking claw intersects with a centerline of the other locking claw is 10 to 120 degrees; and the locking member is locked to at least one of a lens frame and a nose pad, the at least one of a lens frame and a nose pad having at least one of a locking convex part locked by being held between the locking claws of the locking member and a locking concave part which engages lateral outer surfaces of each locking claw.

2. The eyeglasses according to claim 1, wherein the centerline of the one locking claw intersects with the centerline of the other locking claw on an outside of the outer peripheral edge.

3. The eyeglasses according to claim 2, wherein a locking convex part locked by being held between the locking claws of the locking member is provided on at least one of the lens frame and the nose pad.

4. The eyeglasses according to claim 2, wherein a fitting groove in which the outer peripheral edge of the lens is fitted is provided on at least one of the lens frame and the nose pad, and a locking convex part locked by being held between the locking claws of the locking member is provided in the fitting groove.

5. The eyeglasses according to claim 1, wherein the centerline of the one locking claw intersects with the centerline of the other locking claw on an inside of the outer peripheral edge.

6. The eyeglasses according to claim 5, wherein a locking concave part locked by being held by the locking claws of the locking member is provided on at least one of the lens frame and the nose pad.

7. The eyeglasses according to claim 5, wherein a fitting groove in which the outer peripheral edge of the lens is fitted is provided on at least one of the lens frame and the nose pad, and a locking concave part locked by being held by the locking claws of the locking member is provided in the fitting groove.

8. The eyeglasses according to claim 1, wherein each of the locking claws has a width and a height, and the width is smaller than the height.

9. The eyeglasses according to claim 1, wherein the locking member is projectingly provided in a concave part formed at the outer peripheral edge of the lens.

10. The eyeglasses according to claim 1, wherein the angle is 30 to 90 degrees.

11. The eyeglasses according to claim 1, wherein the locking member is locked to a nose pad, the nose pad having at least one of the locking convex part and the locking concave part.

12. The eyeglasses according to claim 1, wherein at least one of the locking claws has a curved root part adjacent the outer peripheral edge of the lens.

13. The eyeglasses according to claim 1, wherein at least one of the locking claws has a curved end at the remote tip.

* * * * *